(12) United States Patent
Phillips et al.

(10) Patent No.: US 7,570,630 B1
(45) Date of Patent: Aug. 4, 2009

(54) DIALED-DIGIT BASED DETERMINATION OF WHETHER TO ORIGINATE A CALL AS A CIRCUIT-SWITCHED CALL OR A PACKET-SWITCHED CALL

(75) Inventors: Jeffrey F. Phillips, Lees Summit, MO (US); Lyle W. Paczkowski, Mission Hills, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 760 days.

(21) Appl. No.: 10/909,900

(22) Filed: Aug. 2, 2004

(51) Int. Cl.
*H04L 12/66* (2006.01)
*H04W 4/00* (2009.01)
(52) U.S. Cl. ...................... 370/352; 370/338
(58) Field of Classification Search ................ 370/228, 370/230, 235, 248, 259, 270, 338, 351, 352, 370/354, 356, 401, 404, 493, 353, 419; 379/93.01, 379/228; 709/228
See application file for complete search history.

(56) References Cited

U.S. PATENT DOCUMENTS

| | | |
|---|---|---|
| 4,076,964 A | 2/1978 | Henrion et al. |
| 5,072,442 A | 12/1991 | Todd |
| 5,091,905 A | 2/1992 | Amada |
| 5,335,276 A | 8/1994 | Thompson et al. |
| 5,402,424 A | 3/1995 | Kou |
| 5,452,289 A | 9/1995 | Sharma et al. |
| 5,453,986 A | 9/1995 | Davis et al. |
| 5,533,019 A | 7/1996 | Jayapalan |
| 5,534,937 A | 7/1996 | Zhu et al. |
| 5,564,077 A | 10/1996 | Obayashi et al. |
| 5,594,782 A | 1/1997 | Zicker et al. |
| 5,610,910 A | 3/1997 | Focsaneanu et al. |
| 5,640,388 A | 6/1997 | Woodhead et al. |
| 5,654,957 A | 8/1997 | Koyama |
| 5,754,542 A | 5/1998 | Ault et al. |
| 5,757,772 A | 5/1998 | Thornberg et al. |
| 5,764,736 A | 6/1998 | Shachar et al. |
| 5,777,991 A | 7/1998 | Adachi et al. |
| 5,805,602 A | 9/1998 | Cloutier et al. |
| 5,898,697 A | 4/1999 | Hurme et al. |

(Continued)

FOREIGN PATENT DOCUMENTS

EP    1289235 A2    4/1995

(Continued)

OTHER PUBLICATIONS

U.S. Appl. No. 10/835,819, filed Apr. 30, 2004 entitled "System and Method for Voice-Over-Packet Calling with PSTN Backup".

(Continued)

*Primary Examiner*—Kevin C Harper

(57) ABSTRACT

A method and apparatus are disclosed for causing a telephone device to selectively originate a call as a circuit-switched call or a packet-switched call, depending on the telephone number dialed by a user of the telephone device. By way of example, the telephone device can determine that the dialed telephone number is an international telephone number and can responsively originate the call as a packet-switched call, or the telephone device can determine that the dialed telephone number is not an international telephone number and can responsively originate the call as a circuit-switched call.

10 Claims, 3 Drawing Sheets

U.S. PATENT DOCUMENTS

| | | | |
|---|---|---|---|
| 5,912,882 | A | 6/1999 | Yafuso et al. |
| 5,996,018 | A | 11/1999 | Duault et al. |
| 6,011,978 | A | 1/2000 | Ault et al. |
| 6,029,252 | A | 2/2000 | Manning |
| 6,081,844 | A | 6/2000 | Nowatzyk et al. |
| 6,134,235 | A | 10/2000 | Goldman et al. |
| 6,141,560 | A | 10/2000 | Gillig et al. |
| 6,161,160 | A | 12/2000 | Niu et al. |
| 6,178,170 | B1 | 1/2001 | Duree et al. |
| 6,195,697 | B1 | 2/2001 | Bowman-Amuah |
| 6,253,249 | B1 | 6/2001 | Belzile |
| 6,282,192 | B1 | 8/2001 | Murphy et al. |
| 6,360,271 | B1 | 3/2002 | Schuster et al. |
| 6,389,010 | B1 | 5/2002 | Kubler et al. |
| 6,484,027 | B1 | 11/2002 | Mauney et al. |
| 6,496,477 | B1 * | 12/2002 | Perkins et al. ............. 370/228 |
| 6,680,923 | B1 | 1/2004 | Leon |
| 6,714,536 | B1 * | 3/2004 | Dowling .................... 370/356 |
| 7,239,629 | B1 * | 7/2007 | Olshansky et al. ......... 370/353 |
| 7,283,515 | B2 * | 10/2007 | Fowler ....................... 370/352 |
| 2001/0036172 | A1 * | 11/2001 | Haskal ....................... 370/352 |
| 2002/0086636 | A1 | 7/2002 | Tracy et al. |
| 2002/0102974 | A1 | 8/2002 | Raith |
| 2002/0167940 | A1 * | 11/2002 | Low et al. .................. 370/352 |
| 2003/0236091 | A1 | 12/2003 | Wonak et al. |
| 2004/0142689 | A1 * | 7/2004 | Boda ........................ 455/432.1 |
| 2005/0068947 | A1 * | 3/2005 | Sanathana Murthy et al. .... 370/368 |
| 2005/0201359 | A1 * | 9/2005 | Nelson et al. ............... 370/352 |

FOREIGN PATENT DOCUMENTS

| | | |
|---|---|---|
| GB | 2300789 | 12/1995 |
| WO | WO 91/08629 | 6/1991 |

OTHER PUBLICATIONS

U.S. Appl. No. 10/364,568, filed Feb. 10, 2003 entitled "Method and System for Dynamically Delivering a Voice Call as Voice Call as Voice or Data Depending on Data-Mode of Destination Terminal".

Henk Uijterwaal, "Internet Delay Measurements Using Test Traffic Installing and Hosting a Test Box", RIPE NCC, http://www.ripe.net/test-traffic/Notes/RIPE_168/note.html (Mar. 1998).

Henk Uijterwaal and Olaf Kolkman, "Internet Delay Measurements Using Test Traffic Design Note", RIPE NCC, http://www.ripe.net/test-trafic/Notes/RIPE_158/ (May 1997).

Almes et al., "A One-Way Delay Metric for IPPM," Advanced Network & Services, Network Working Group, http://www.ietf.org/internet-drafts/draft-ietf-ippm-delay-05.txt (Nov. 1998).

"Internet Protocol Performance Metrics—Evolution Through Understanding", http://www.advanced.org/ippm.html (Aug. 1997).

Henk Uijterwaal, "Test Traffic Project Homepage", RIPE NCC, http://www.ripe.net/test-traffic/ (Nov. 1998).

Guerin, et al., "QoS Routing Mechanisms and OSPF Extensions", Internet Engineering Task Force (Dec. 1998).

Banerjea, et al., "Designing QoSMIC: A Quality of service Sensitive Multicast Internet Protocol", Internet-Draft, Inter-Domain Multicast Routing (Apr. 1998).

Stallings, "ISDN and Broadband ISDN with Frame Relay and ATM", Fourth Edition, pp. 463-465, (1995).

The ATM Forum Technical Committee, "Traffic mangement specification", Version 4.0, pp. 54-60, (Apr. 1996).

Phone+International, "Telenor Global Services to Route International Calls Through ITXX," http://www.phoneplusinternational.com/hotnews/19h5843.html (Sep. 2001).

Cable Datacom News, "Cable IP Telephony Primer", http://www.cabledatacomnews.com/iptel/iptel.html (Jul. 2003).

Cisco Systems, "Cisco ATA 186 Analog Telephone Adaptor", document states "Copyright © 1992-2002".

Swinehart et al., "Adding Voice to an Office Computer Network," Proceedings of the IEEE Globecom '83, Feb. 1984.

Zellweger et al., "An Overview of the Etherphone System and Its Applications," Proceedings of the 2nd IEEE Conference on Computer Workstations, Mar. 1988.

Vin et al., "Multimedia Conferencing in the Etherphone Environment," IEEE Computer, vol. 24, No. 10, Oct. 1991.

Koyama et al., "Personal Multimedia Communication Systems," Hitachi Review, vol. 44, No. 4, Aug. 1995.

Qualcomm, "STU-III Service Option for Wideband Spread Spectrum Systems (Proposed Draft Text)," Version 3.05, Jun. 1995.

Palo Alto Research Center, "Etherphone: Collected Papers 1987-1988," May 1989.

* cited by examiner

DIALED-DIGIT BASED DETERMINATION OF WHETHER TO ORIGINATE A CALL AS A CIRCUIT-SWITCHED CALL OR A PACKET-SWITCHED CALL

FIELD OF THE INVENTION

The present invention relates to telecommunications and, more particularly, to origination of telephone calls such as voice calls, fax calls and modem calls, for instance.

DESCRIPTION OF RELATED ART

In traditional telephone systems, a user places a telephone call by lifting a telephone receiver or otherwise taking a telephone off hook, and dialing a desired telephone number of the called party. In landline (POTS) telephone system, as the user dials the telephone number, the dialed digits pass over a local loop telephone line to a central office switch, which then works to set up the call over the PSTN to the called party. In a cellular wireless telephone system, once the user finishes dialing the telephone number, the user typically engages a TALK or SEND key, to cause the telephone to transmit the dialed telephone number in a call-origination message to a radio access network switch, which similarly works to set up the call over the PSTN to the called party.

A problem with traditional circuit-switched telephony is that calls placed over the PSTN require the use of dedicated circuits, such as a dedicated channel on a trunk between PSTN switches. This dedication of resources translates to relatively high costs for users.

Recent advances in voice-over-IP (VoIP) communication have enabled the placement of calls instead over packet-switched networks. For instance, a user can employ a VoIP telephone (e.g., a multimedia computer with a telephone handset and appropriate communication software) to place and receive calls over the Internet. The VoIP telephone, for instance, might engage in industry standard Session Initiation Protocol (SIP) signaling or H.323 signaling with a remote gateway or telephone on the Internet, so as to set up a VoIP call. In a VoIP call, voice is carried in packets, each of which is routed independently over the packet-switched network from point to point, thereby often avoiding the need for dedicated circuits. Consequently, VoIP telephone calls tend to be far less expensive than traditional circuit-switched telephone calls.

SUMMARY

The present invention provides an improved mechanism for originating calls. According to an exemplary embodiment of the invention, an originating telephone device (e.g., a voice telephone, a facsimile machine, a dial-up computer modem, or other such device, whether landline or wireless) will decide whether to place a given call as a circuit-switched call or a packet-switched call, depending on the telephone number dialed. In particular, the telephone device will receive a telephone number dialed by a user and will evaluate the telephone number to determine whether the telephone number has a predetermined value or falls within a predetermined class (e.g., number of digits, digit combination, etc.) If so, the telephone device will originate the call over a packet-switched network; and if not, the telephone device will originate the call as a normal circuit-switched call.

The invention can be advantageously applied to facilitate automatic placement of international telephone calls as packet-switched calls, so as to avoid or greatly reduce international calling charges. To do so in the North American telephone system, the telephone device could simply evaluate the dialed telephone number to determine whether it is at least 12 digits long, which would usually indicate that the number includes a country code. If the telephone number is at least 12 digits long, then the telephone device can responsively originate the call as a packet-switched call. On the other hand, if the telephone number is less than 12 digits long, then the telephone device can responsively originate the call as a circuit-switched call.

The functions that a telephone device carries out to originate a packet-switched call will differ from the functions that the telephone device carries out to originate a circuit-switched call. In a preferred embodiment, to originate a packet-switched call, the telephone device will first acquire packet-data connectivity (if it does not already have it) and will then engage in packet-based signaling (such as SIP or H.323) to set up a media session with another packet node. In contrast, to originate a circuit-switched call, the telephone device will simply send an origination request to a local switch, asking the switch to set up a call to the dialed telephone number. (The fact that a circuit-switched call may pass through one or more packet-switched links and a packet-switched call may pass through one or more circuits does not change the fact that the user telephone device itself will originate a call selectively as a packet-switched call or circuit-switched call depending on the dialed telephone number.)

These as well as other aspects and advantages will become apparent to those of ordinary skill in the art by reading the following detailed description, with reference where appropriate to the accompanying drawings. Further, it should be understood that the foregoing summary and other arrangements and functions described herein are intended to be examples only and do not necessarily limit the scope of the invention, which is defined by the claims.

DETAILED DESCRIPTION OF AN EXEMPLARY EMBODIMENT

Figure 1:
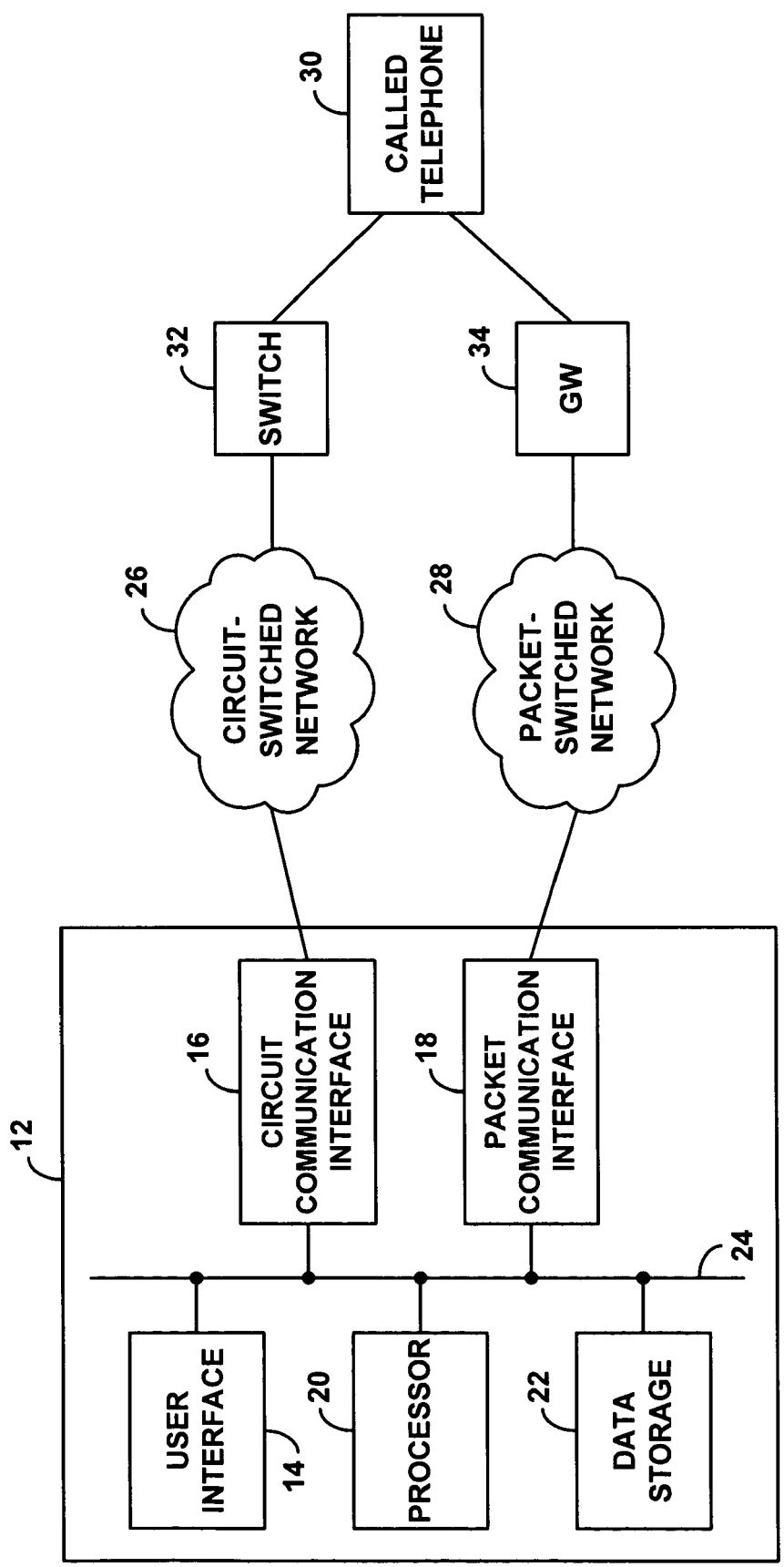
FIG. 1 is a simplified block diagram of a network in which an exemplary embodiment of the invention can be implemented.

In one respect, an exemplary embodiment of the invention may take the form of telephone device that includes (i) a user interface for receiving, from a user, a telephone number to call, and (ii) program logic executable to decide, based on the telephone number, whether the telephone device should originate a call to the telephone number as a circuit-switched call or as a packet-switched call. With this arrangement, if the program logic decides that the telephone device should originate the call as a circuit-switched call, then the telephone device originates the call as a circuit-switched call, and, if the program logic decides that the telephone device should originate the call as a packet-switched call, then the telephone device originates the call as a packet-switched call.

In another respect, an exemplary embodiment of the invention may take the form of a method that involves (i) receiving into a telephone device, from a user, a telephone number to call, and (ii) making a determination, based on the telephone number, whether the telephone device should originate the call as a circuit-switched call or as a packet-switched call. With this method, if the determination is that the telephone device should originate the call as a circuit-switched call, then telephone device originates the call as a circuit-switched call, and if the determination is that the telephone device should originate the call as a packet-switched call, then the telephone device originates the call as a packet-switched call.

Generally speaking, the telephone device can be any device that a user can employ to originate a telephone call and that is able to selectively originate calls as either circuit-switched calls or packet-switched calls. An exemplary telephone device can be a unitary structure, or it could be a combination of more than one structures, connected together in any way desired, such as a conventional landline or wireless telephone connected with a computer or adjunct box.

By way of example, the telephone device can be a cellular telephone or other wireless communication device that is equipped to place circuit-switched telephone calls and packet-switched telephone calls. In addition, or alternatively, the telephone device can be a voice telephone, a fax machine and/or a dial-up modem, or some other sort of telephone device operable to place telephone calls.

The function of receiving a telephone from a user can involve the user expressly dialing the telephone number into the telephone device, or it can involve the user engaging an auto-dial (speed-dial) feature on or in connection with the telephone device. For instance, the telephone device may have preprogrammed telephone numbers that the user can dial by pressing a designated button. As another example, the telephone device can have a TAPI interface or other interface to an external device such as a computer or adjunct box through which the user can cause the telephone device to dial a desired number.

To decide, based on the user-supplied telephone number whether the telephone device should originate the call as a circuit-switched call or as a packet-switched call, the program logic may be arranged to determine, based on the telephone number, whether the call is an international call. For instance, the program logic may be arranged to determine based on the length of the telephone number (e.g., the number of digits) whether the call is an international call, such as by concluding that the call is an international call if the telephone number is at least 12 digits (or some other designated number of digits). Alternatively or additionally, the program logic may be arranged to determine whether the telephone number includes a country code, such as by comparing the initial digits of the telephone number with a known set of country codes, and to conclude that the call is an international call if the telephone number includes a country code.

If the program logic determines that the call is an international call, then the program logic would conclude that the device should originate the call as a packet-switched call. Whereas, if the program logic determines that the call is not an international call, then the program logic would conclude that the device should originate the call as a circuit-switched call.

More generally, the program logic can be arranged to determine that the device should originate the call as a circuit-switched call if the telephone number has a certain value or falls within a certain class, and to determine that the device should otherwise originate the call as a circuit-switched call (or vice versa). For example, the program logic can be arranged to decide based on the length of the telephone number whether the device should originate the call as a circuit-switched call or as a packet-switched call.

As another example, the program logic can be arranged to decide based on the specific digits of part of or the whole telephone number, such as whether the telephone number begins with digits known to represent a particular country code, area code, and/or prefix, whether the number as a whole matches a number in a predefined list, or whether a phone book entry or the like containing the telephone number indicates that calls to the number should be originated as circuit-switched calls or packet-switched calls.

For instance, the telephone device could include a local telephone listing (phone book) in which a user could specify a category into which each listed telephone number falls, and the telephone device could include other stored data specifying that calls to telephone numbers in certain categories should be originated as circuit-switched calls and/or that calls to telephone numbers in certain other categories should be originated as packet-switched calls. As a specific example, the telephone listing could designate certain telephone numbers as "business" numbers and others as "personal" numbers, and other data could indicate that calls to business numbers should be placed as circuit-switched calls while calls to personal numbers should be placed as packet-switched calls. When the telephone device receives a telephone number dialed by a user, the program logic can then refer to the telephone listing to determine whether the number is a business number or a personal number and can then decide based on that categorization whether to originate the call as a circuit-switched call or a packet-switched call.

To originate a call as a circuit-switched call, the telephone device would simply send the dialed telephone number over an access channel to a local telephone switch, as a request for the switch to set up the call to the telephone number. If the telephone device is a landline PSTN-connected device, this means that the device may need to hold the dialed digits until a decision is made to originate the call as a circuit-switched call, and then release the dialed digits to the local switch, which is contrary to normal telephone operation in which digits pass to the local switch as they are dialed. Thus, to send dialed digits to a local switch, the landline telephone would simply go off hook and send the digits.

If the telephone device is a wireless communication device such as a cellular telephone, the device may send the dialed digits in a conventional call-origination message over an air interface channel to a local switch (e.g., MSC), which would cause the switch and/or other radio access network infrastructure to assign a radio link traffic channel over which the telephone device can engage in the call.

To originate a call as a packet-switched call, on the other hand, the telephone device would first acquire packet-data connectivity, if it does not already have packet-data connectivity, and device would then engage in packet-based call setup signaling to set up the call. For instance, the device may engage in SIP or H.323 (or other) IP-based call setup signaling with a remote endpoint such as a remote IP-telephony device being called, or a remote IP-telephony gateway that serves the called number.

If SIP signaling is used to set up the call, then the telephone device could initiate signaling to a SIP address of the called party, via a suitable proxy. For instance, if Telco provides SIP call proxy services and the dialed number is 49-372-555-1212, the telephone device could send a SIP INVITE to a Telco SIP proxy, seeking to set up a call to the SIP address "sip:+493725551212@telco.com," which the proxy could forward on to the applicable IP address. Additional SIP signaling would then occur to complete set up of the call, in the form of an RTP session between the telephone device and a remote telephone device or gateway for instance.

Alternatively, the telephone device may dip into an address management system (AMS) or gatekeeper on the packet-switched network to request translation of the dialed telephone number into an IP address of a node arranged to serve that telephone number. Akin to a DNS lookup, for instance, the telephone device can programmatically send a request message to an AMS server. The server can then refer to mapping data to identify the IP address or domain of the applicable node, and can return that IP address or domain to the telephone device, for use by the telephone device to initiate the call through IP-based signaling to that IP address or domain.

Still alternatively, the telephone device might itself contain stored correlation data that associates telephone numbers with IP addresses or domains. (A user could provision this data into the device through a suitable interface or could download the information to the device through a suitable interface.) Thus, once the telephone device has packet-data connectivity, it can begin to engage in call setup signaling to set up a packet-based telephone call with the network address that the correlation data associates with the dialed telephone number.

In some cases, the telephone device may already have packet-data connectivity, in which case it would not need to re-acquire packet-data connectivity in order to be able to originate a packet-switched call. However, in other cases, the telephone device may not currently have packet-data connectivity, so it would need to acquire packet-data connectivity. To acquire packet-data connectivity, the telephone device would generally acquire a physical link, data link and network link (or any of these links that the device does not already have). The device could do this in various ways.

By way of example, if the device is a cellular telephone, it could acquire packet-data connectivity by sending an origination message over an air interface access channel into a radio access network (RAN), providing the RAN with a packet-data origination code. The RAN may then assign an air interface traffic channel (radio link) for use by the device. Further, the RAN may forward the request to an IP-telephony gateway such as a packet data serving node (PDSN), which may negotiate with the device to establish a point-to-point protocol (PPP) data link layer connection. Further, the PDSN, a mobile-IP home agent, or some other entity may assign an IP address for use by the device, thereby providing the device with a network layer connection.

As another example, if the device is a landline telephone device, it could similarly work to set up data link and network layer connections with an IP-telephony gateway. For instance, it could dial out a circuit call over the PSTN to a local IP-telephone gateway (e.g., an AMERICA ONLINE gateway), establish a PPP data-link layer connection with the gateway, and obtain an IP address from the gateway. Similarly, it could engage an internal or external switch (hardware or software based) to invoke a connection with a local packet-data connection, such as a cable or DSL modem or LAN server and acquire an IP address if it does not already have one.

If the decision is for the telephone device to originate the call as a circuit-switched call, then, after the device originates the call as a circuit-switched call, the device would exchange non-packetized bearer data (such as voice or voice-band data). For example, in a conventional landline voice call, the telephone device may send and receive a voice signal modulated over a local loop telephone line connected with a local switch. In a conventional cellular wireless voice call, the telephone device may send and receive a voice signal modulated over an air interface connection with a radio access network switching point. In these arrangements, as a general matter, the device would not packetize and depacketize voice, although it might frame it.

On the other hand, if the decision is for the telephone device to originate the call as a packet-switched call, then, after the device originates the call as a packet-switched call, the device would exchange packetized bearer data. For example, in a voice-over-IP call, the device may send and receive voice in a digitized, packetized format, such as in a sequence of packets formatted according to the Real-time Transport Protocol. In some cases, the device may exchange these packets over a serial link, such as where the device has a PPP data link with an IP telephony gateway, but the device would nevertheless itself (or through the assistance of some adjunct or otherwise associated device) send and receive packets between its assigned IP address and the IP address of a remote entity receiving the call.

Referring now to the drawings, FIG. 1 is a simplified block diagram depicting a network arrangement for carrying out the exemplary embodiment. As shown in the figure, the arrangement includes a telephone device 12, which includes a user interface 14, a circuit communication interface 16, a packet communication interface 18, a processor 20, and data storage 22, coupled together by a system bus, network or other mechanism 24.

The user interface 14 functions to receive a telephone number dialed by a user (either expressly dialed or auto-dialed) and to provide the telephone number to the processor 20. For instance, the user interface may comprise a conventional telephone keypad and perhaps a SEND or TALK key for the user to engage in order to complete entry of the dialed number. The user interface could thus provide the telephone number to the processor as it is being dialed, or the user interface could provide the telephone number to the processor upon completion of dialing, e.g., when the user engages a SEND or TALK key.

Further, the user interface 14 facilitates exchange of media (such as voice, fax documents, and modem signals) with a user, or with a local external device such as a computer. For instance, the user interface 14 can be configured with a microphone and speaker to receive voice spoken by the user and to output voice or other audio signals to the user. As another example, the user interface 14 can be configured to receive and scan documents to be faxed, and to print out incoming faxes. And as yet another example, the user interface can include logic to facilitate exchange data with an external computer, for modem communication.

The circuit communication interface 16 provides connectivity with an access link to a circuit-switched network 26, such as the PSTN. By way of example, the circuit communication interface 16 can be a conventional (POTS) landline telephone interface circuit, or it could be a cellular wireless communication interface such as a Qualcomm MSM-series chipset and associated antenna for communicating with a cellular radio access network that provides connectivity in turn with a circuit-switched network.

The packet communication interface 18 provides connectivity with an access link to a packet-switched network 28, such as a local area network (LAN) or wide area network (WAN) such as the Internet. By way of example, the packet communication interface 18 can be an Ethernet network interface card or module, for coupling with an Ethernet link to a packet-switched network. As another example, the packet communication interface 18 can be a cellular wireless communication interface such as a Qualcomm MSM-series chipset and associated antenna for communicating with a cellular radio access network that provides connectivity in turn with a packet-switched network.

In some circumstances, the circuit and packet communication interfaces 16, 18 may be integrated into a single communication interface. For instance, if the telephone device would gain packet-data connectivity through a PPP data link connection via a circuit access link (such as a radio access network or a dial-up connection over a local loop telephone line), then the circuit and packet communication interfaces 16, 18 may be simply a circuit communication interface. Software or other logic would facilitate using that single interface for the intended purpose, either circuit-switched call origination or packet-switched call origination, in a given instance.

Processor 20 includes one or more general purpose microprocessors and/or one or more dedicated processors such as digital signal processor, application specific integrated circuits, or the like. Data storage 22, in turn, comprises volatile and/or non-volatile storage, such as magnetic, optical or other storage, including perhaps Flash memory or disk storage. Data storage 22 may integrated in whole or in part with processor 20. For instance, processor 20 could include integrated storage such as cache memory, which can be considered part of data storage 22.

Data storage 22 contains program instructions executable by processor 20 to carry out various functions described herein. The program instructions could be stored in compiled form as sets of bits on which the processor could operate so as to cause various functions to occur. Generally speaking, the program instructions and processor, and/or any other logical elements (whether hardware, firmware and/or software) for carrying out the functions described herein, can be considered "program logic."

By way of example, the program instructions preferably define logic to cause processor 20 to receive a telephone number dialed by a user. This function could involve simply receiving the dialed number once the user engages a SEND or TALK button upon completion of dialing. Alternatively, this function could involve receiving digits as the user dials them (or causes them to be dialed) and detecting when dialing is complete. The function of detecting when dialing is complete can involve determining when the digits dialed so far represent a complete telephone number, pursuant to industry standards for telephone number format, such as the North American Numbering Plan. Further, the function of detecting when dialing is complete could involve detecting a threshold-duration pause after the last dialed digit.

The program instructions also preferably define logic to cause processor 20 to evaluate a dialed telephone number so as to determine whether to originate the call to that number as a circuit-switched call or as a packet-switched call. As described above, this function can involve determining whether the telephone number takes a certain form or falls within a certain class of telephone numbers. For instance, the function can involve determining whether the telephone number is an international telephone number, by reference to a standard numbering plan, determining whether the telephone number has a certain area code or certain prefix, and, based on the determination, determining whether to originate the call as a circuit-switched call or as a packet-switched call.

Alternatively, data storage 22 might include a phone book or the like, which indicates expressly for each of a plurality of telephone numbers whether calls to the numbers should be originated as circuit-switched calls or as packet-switched calls. The logic of the program instructions could cause processor 20 to refer to the local phone book to determine whether the phone book indicates that the call to the telephone number at issue should be originated as a circuit-switched call or as a packet-switched call.

Note also that a user could also dial special digits, such as a feature code, as part of a telephone number, which the logic of the program instructions could interpret as a directive to originate the call as a circuit-switched call or as a packet-switched call. For instance, the user could begin the telephone number 789-555-1234 with the prefix *40 to indicate that the telephone device should originate the call as a circuit-switched call, or with the prefix *50 to indicate that the telephone device should originate the call as a packet-switched call. The logic of the program instructions could then determine based on the dialed "telephone number" *407895551234 that the call should be originated as a circuit-switched call or based on the dialed "telephone number"*507895551234 that the call should be originated as a packet-switched call.

In turn, the program instructions preferably define logic to cause processor 20 to originate circuit-switched calls and packet-switched calls, so that telephone device can selectively originate a call as a circuit-switched call or a packet-switched call in a given instance.

By way of example, to originate a call as a circuit-switched call, the logic could cause the processor to take the telephone device off hook and to send the dialed telephone number to a local switch as a request for the switch to set up the call over the PSTN. If the telephone device is a landline telephone, this process can involve simply establishing a circuit over a local loop telephone line with a central office switch and dialing out the telephone number on that circuit. If the telephone is a cellular telephone, this process can involve sending a call-origination message over an air interface access channel to an MSC in a radio access network.

As another example, to originate a call as a packet-switched call, the logic could cause the processor to first acquire packet-data connectivity if it does not already have it and to then engage in packet-based call setup signaling with a remote telephone or gateway to set up an RTP or other packet-based call. As noted above, the call setup signaling could be SIP signaling, in which case the logic would preferably define a SIP user agent application for engaging in SIP signaling. Alternatively, the call setup signaling could be H.323 signaling, in which case the logic would preferably define an H.323 messaging application. The signaling could take other forms as well. Further, to facilitate engaging in RTP or other IP-based communication, the logic preferably defines an RTP client application and associated codecs and logic to be able to digitize, compress, packetize and transmit outgoing media, and to be able to depacketize, decompress, and play out incoming media.

FIG. 1 further depicts a called telephone device 30, which may be a wireless or landline telephone device and may be served by a remote switch 32 and/or gateway 34. Called telephone device 30 could be equipped to engage in just circuit-switched telephone calls, e.g., POTS calls, or in just packet-switched telephone calls, e.g., VoIP calls. Alternatively, called telephone device 30 could be equipped to engage in both circuit-switched telephone calls and packet-switched telephone calls, similar to the manner in which telephone device 12 can engage in both circuit-switched telephone calls and packet-switched telephone calls. Thus, called telephone device 30 can receive a call from telephone device 12.

Figure 2:
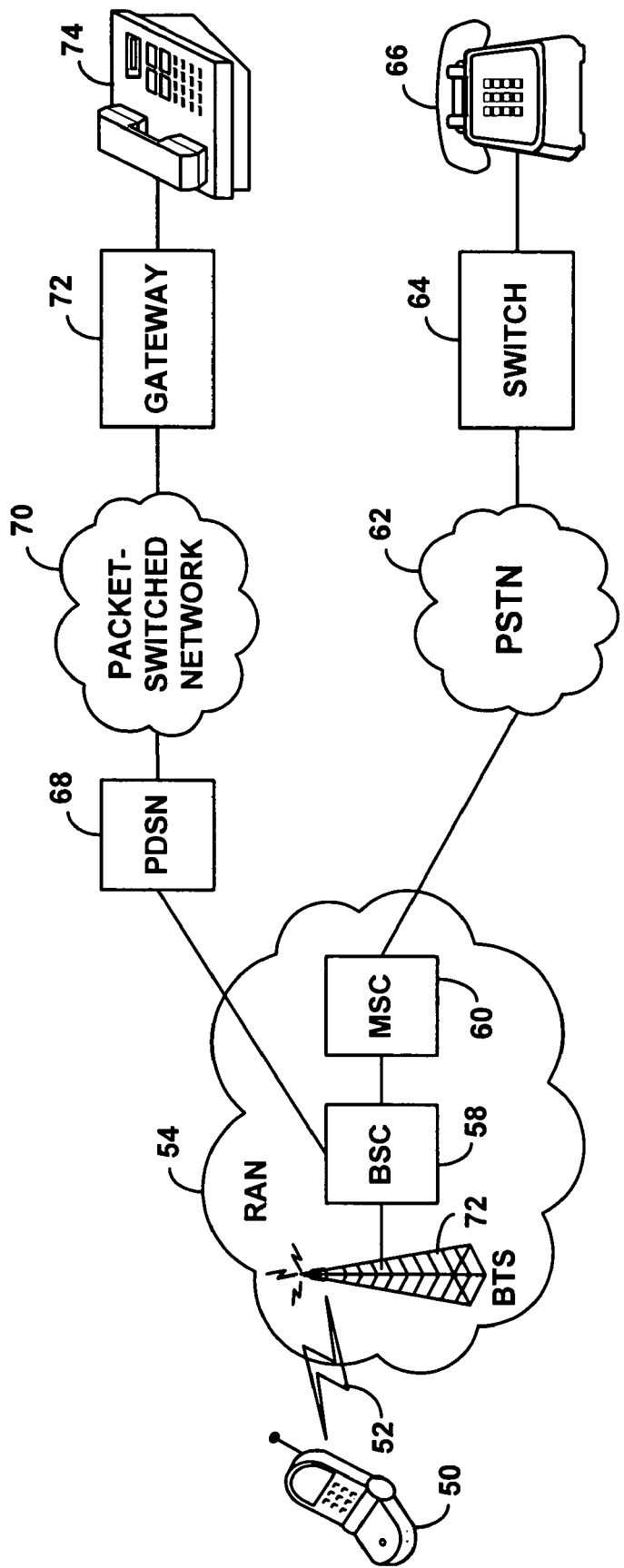
FIG. 2 is a simplified block diagram of an exemplary network in which the telephone device is a cellular wireless communication device such as a cell phone.

Referring next to FIG. 2, a more specific network arrangement is shown, to illustrate how the exemplary embodiment can work in a cellular wireless configuration. In this arrangement, the telephone device is a cellular telephone 50 that is capable of engaging in both traditional circuit-switched voice calls and "next generation" VoIP calls. Cellular telephone 50 communicates over an air interface 52 with a radio access network 54, which includes a base transceiver station (BTS) 56, a base station controller (BSC) 58, and a mobile switching center (MSC) 60. MSC 60 provides connectivity with the PSTN 62, which in turn extends to a remote switch 64 serving a remote telephone device 66. BSC 58 is coupled with a packet data serving node (PDSN) 68, which provides connectivity with a packet-switched network 70 (such as a private packet network or the Internet). Sitting on the packet-switched network 70, in turn, is a remote gateway 72 that serves a remote telephone device 74. Telephone devices 66 and 74 may be a single device or may be separate devices.

In this arrangement, a user 76 may operate cellular telephone 50 to dial a call to a particular telephone number, completing the dialing by engaging a SEND key. The cellular telephone 50 may then evaluate the dialed telephone number to determine whether to originate the call as a circuit-switched call or as a packet-switched call.

If cellular telephone 50 determines, based on the dialed telephone number, that the call should be originated as a circuit-switched call, then cellular telephone 50 may send a conventional call-origination request message over air interface 52 to radio access network 54. MSC 60 would receive the request and then work to set up the call over PSTN 68 with remote switch 64 and in turn with the called telephone 66. In this process, MSC 60 would also instruct BSC 58 to assign an air interface traffic channel over which cellular telephone 50 can engage in the call. Once the call is set up, user 76 could communicate with a user of called telephone 66.

On the other hand, if cellular telephone 50 determines, based on the dialed telephone number, that the call should be originated as a packet-switched call, then cellular telephone 50 may first acquire packet-data connectivity and then engage in packet-based call setup signaling to set up the call.

For instance, cellular telephone 50 may first send a packet-data origination request message over air interface 52 to radio access network 54. MSC 60 would receive and forward the request back to BSC 58 for handling. BSC 58 would assign an air interface traffic channel over which cellular telephone 50 can communicate. Further, a packet control function (PCF) of BSC 58 would signal to PDSN 68, and PDSN 68 and cellular telephone 50 would work to set up a PPP data link. PDSN 68 and/or a mobile-IP home agent (not shown) would then assign an IP address for cellular telephone 50 to use when communicating on packet-switched network 70.

After acquiring packet-data connectivity, cellular telephone 50 then engages in packet-based call setup signaling with remote gateway 74 or directly with called telephone 76. For instance, cellular telephone 50 could engage in SIP call setup signaling to set up a call to a SIP address derived from the dialed telephone number (e.g., by using the telephone number as the username portion of the SIP address, using a default domain, and signaling through a default SIP proxy server). Alternatively, cellular telephone 50 could perform an AMS lookup to determine a domain or IP address of the remote gateway 74 or telephone 76, with which cellular telephone 50 can engage in call setup signaling. Once the call is set up, user 76 could communicate with a user of called telephone 76, e.g., though an end-to-end RTP session.

Figure 3:
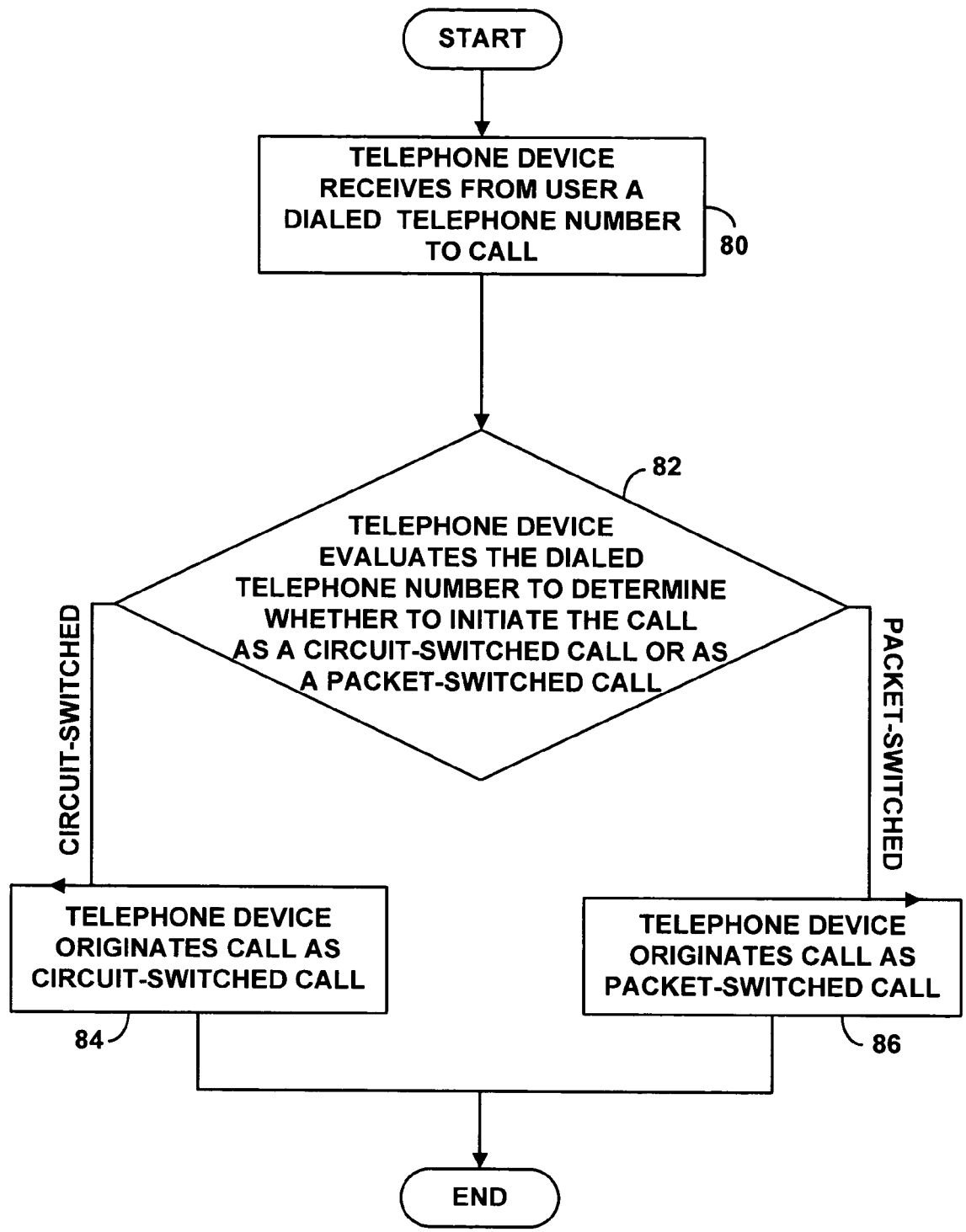
FIG. 3 is a flow chart depicting functions carried out in accordance with the exemplary embodiment.

Finally, FIG. 3 is a flow chart summarizing functions that are carried out in accordance with the exemplary embodiment. As shown in FIG. 3, at step 80, a telephone device receives from a user a telephone number to call. At step 82, the telephone device evaluates the dialed telephone number to determine whether to originate the call as a circuit-switched call or as a packet-switched call. If the determination is to originate the call as a circuit-switched call, then, at step 84, the telephone device originates the call as a circuit-switched call. On the other hand, if the determination is to originate the call as a packet-switched call, then, at step 86, the telephone device originates the call as a packet-switched call.

An exemplary embodiment of the present invention has been described above. Those skilled in the art will understand, however, that changes and modifications may be made to the embodiment described without departing from the true scope and spirit of the invention, which is defined by the claims.

What is claimed is:

1. A telephone device comprising:
   a user interface for receiving, from a user, a telephone number to call, wherein the telephone device is capable of originating a packet-switched call and capable of originating a circuit-switched call, and wherein the telephone device is a device selected from the group consisting of a voice telephone, a fax machine and a dial-up modem, and
   program logic executable to decide, based on the telephone number, whether the telephone device should originate a call to the telephone number as a circuit-switched call or as a packet-switched call,
   wherein the program logic is executable to determine, based on the telephone number, whether the call is an international call and (i) in response to a determination that the call is an international call, to decide that the telephone device should originate the call as a packet-switched call and (ii) in response to a determination that the call is not an international call, to decide that the telephone device should originate the call as a circuit-switched call,
   whereby, if the program logic decides that the telephone device should originate the call as a circuit-switched call, then the telephone device originates the call as a circuit-switched call, and, if the program logic decides that the telephone device should originate the call as a packet-switched call, then the telephone device originates the call as a packet-switched call.

2. A method comprising:
   receiving into a telephone, from a user, a telephone number to call, wherein the telephone is capable of originating a packet-switched call and capable of originating a circuit-switched call;
   making a determination, based on the telephone number, whether to originate the call as a circuit-switched call or as a packet-switched call;
   if the telephone number is not an international number, the telephone originating the call as a circuit-switched call, wherein the telephone originating the call as a circuit-switched call comprises sending the telephone number to a serving switch to request the switch to originate the call; and
   if the telephone number is an international number, the telephone originating the call as a packet-switched call, wherein the telephone originating the call as a packet-switched call comprises acquiring packet-data connectivity and then engaging in packet-based call-setup signaling to set up the call,
   wherein acquiring packet-data connectivity comprises sending a packet-data origination message over an air interface to a radio access network, and acquiring a Mobile-IP address for communication on a packet-switched network.

3. The method of claim 2, wherein engaging in packet-based call-setup signaling to set up the call comprises engaging in signaling of a type selected from the group consisting of Session Initiation Protocol (SIP) signaling and H.323 signaling.

4. The method of claim 2, further comprising:
- if the telephone originates the call as a circuit-switched call, then, after the telephone originates the call as a circuit-switched call, exchanging non-packetized voice data; and
- if the telephone originates the call as a packet-switched call, then, after the telephone originates the call as a packet-switched call, exchanging packetized voice data.

5. The telephone device of claim 1, wherein the program logic is executable to determine, based on a length of the telephone number, whether the call is an international call.

6. The telephone device of claim 1, wherein the telephone device is a wireless communication device.

7. The telephone device of claim 1, wherein the program logic is executable to determine whether the telephone number includes a country code and, if so, to conclude that the call is an international call.

8. The telephone device of claim 1, wherein, to originate a call as a packet-switched call, the telephone device first acquires packet-data connectivity if the telephone device does not already have packet-data connectivity, and the telephone device then engages in packet-based call setup signaling to set up the call.

9. The telephone device of claim 8, wherein, to acquire packet-data connectivity, the telephone device sends an origination message that carries a packet-data origination code.

10. The telephone device of claim 8, wherein the packet-based call setup signaling comprises signaling selected from the group consisting of Session Initiation Protocol (SIP) signaling and H.323 signaling.

* * * * *